July 6, 1937.  A. O. AUSTIN  2,086,150
REACTION CLAMP FOR CONDUCTORS OR THE LIKE
Filed Nov. 29, 1933  6 Sheets-Sheet 1
Fig. 1.
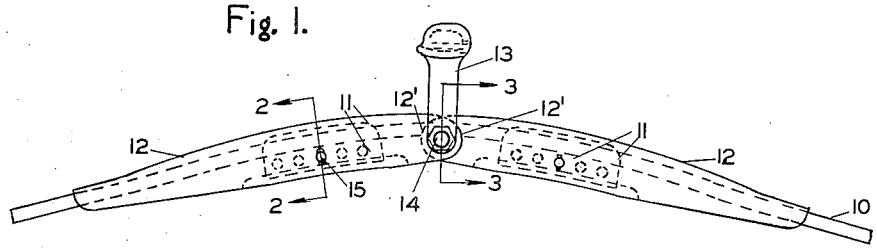
Fig. 2. 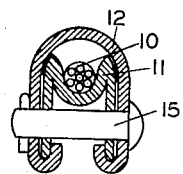   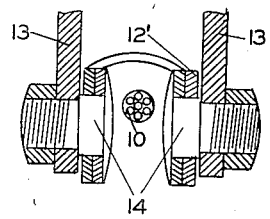 Fig. 3.
Fig. 4.
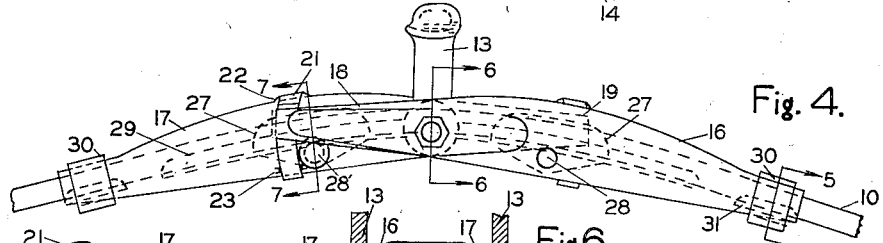
Fig. 7. 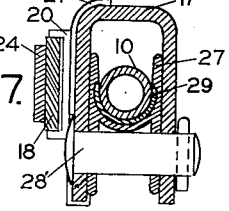   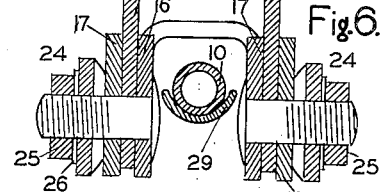 Fig. 6.   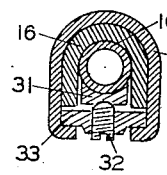 Fig. 5.
Fig. 8.
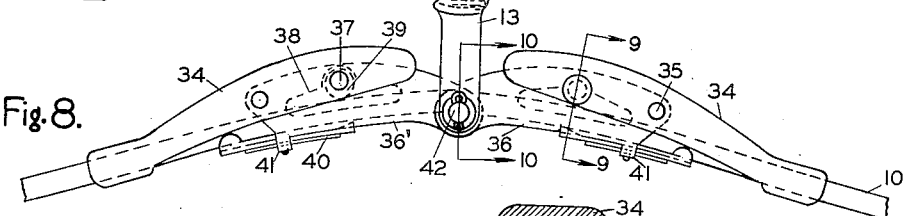
Fig. 10. 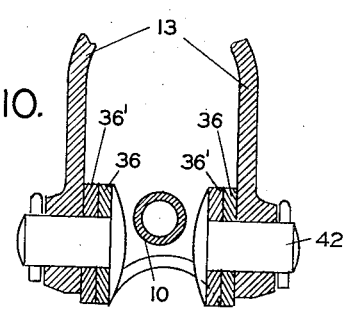   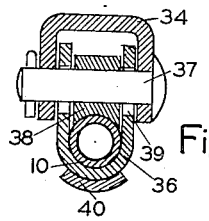 Fig. 9.
INVENTOR
Arthur O. Austin July 6, 1937.  A. O. AUSTIN  2,086,150
REACTION CLAMP FOR CONDUCTORS OR THE LIKE
Filed Nov. 29, 1933  6 Sheets-Sheet 2
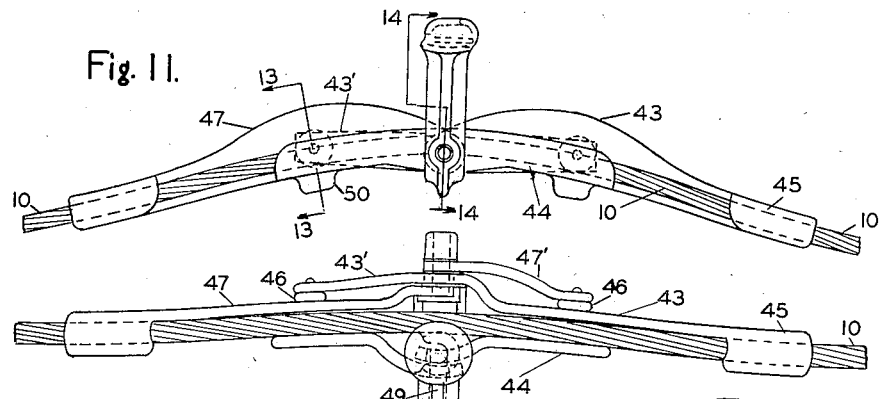
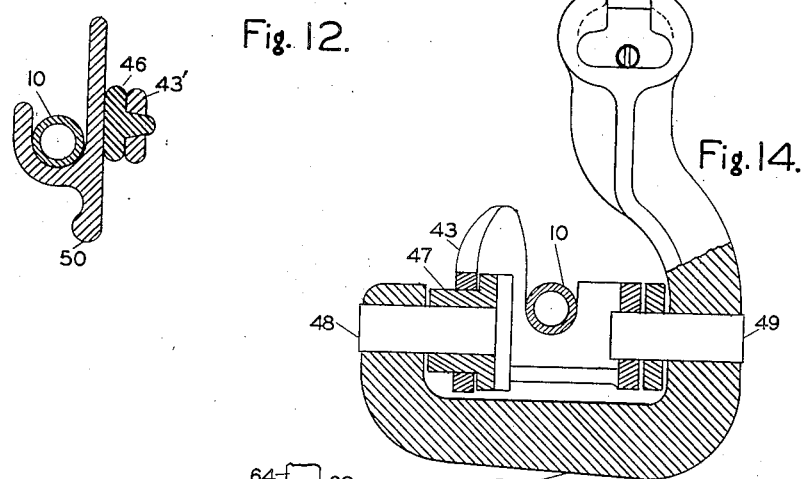
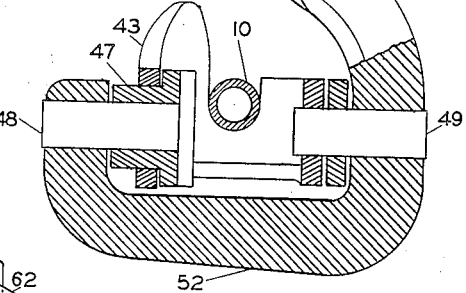
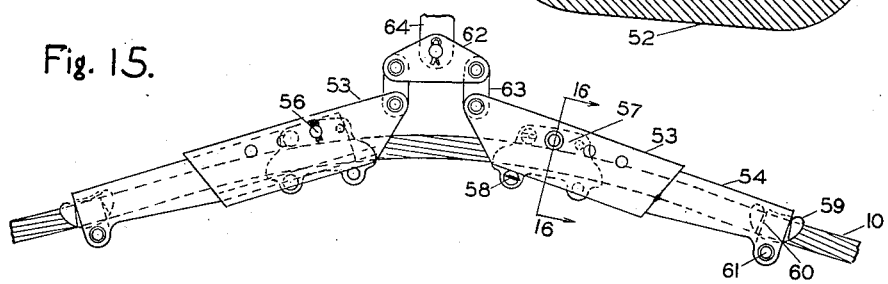
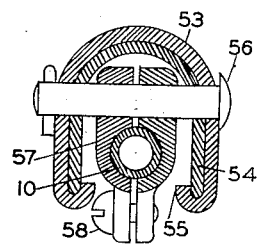
INVENTOR
Arthur O. Austin

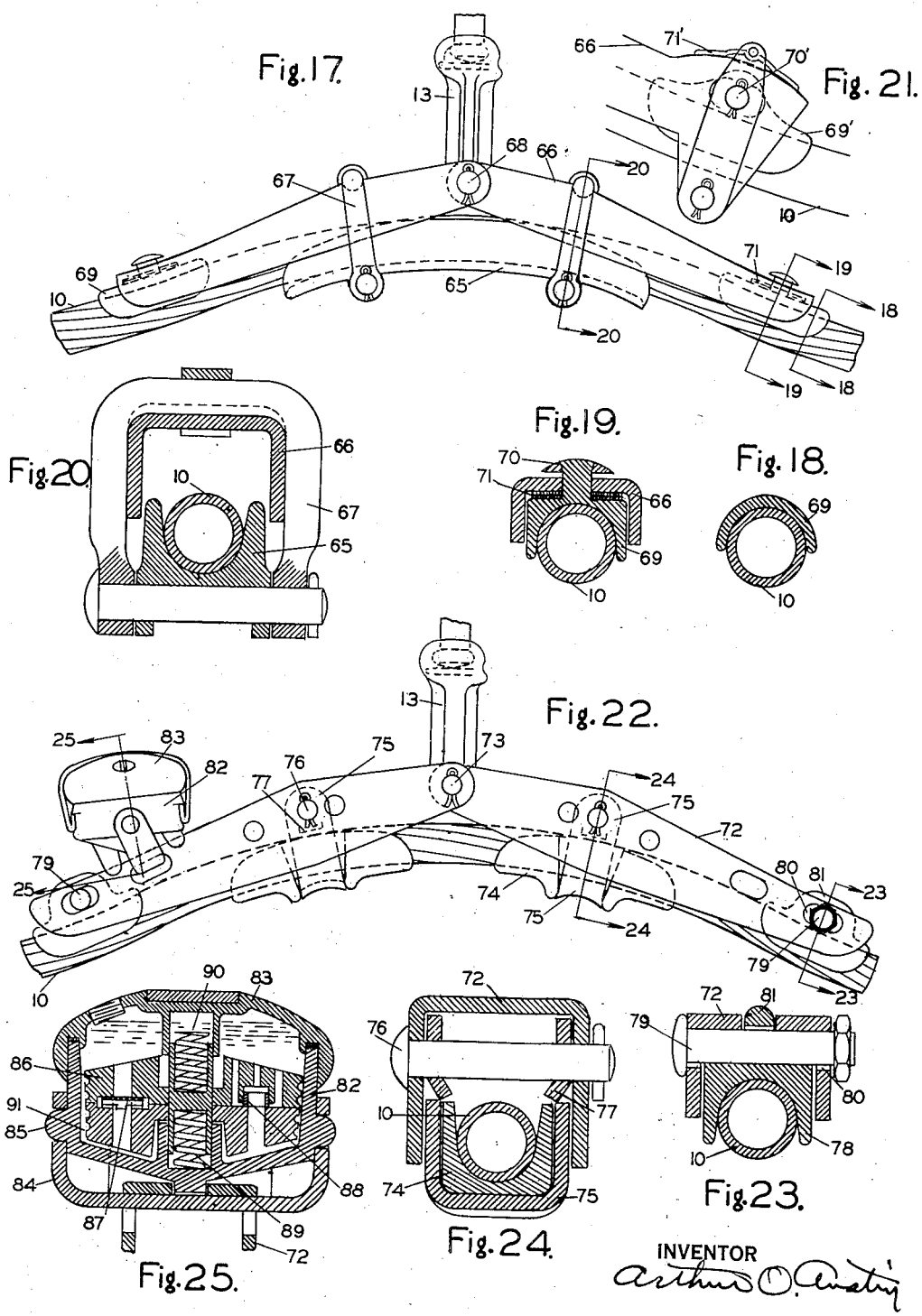

July 6, 1937.   A. O. AUSTIN   2,086,150
REACTION CLAMP FOR CONDUCTORS OR THE LIKE
Filed Nov. 29, 1933   6 Sheets-Sheet 4
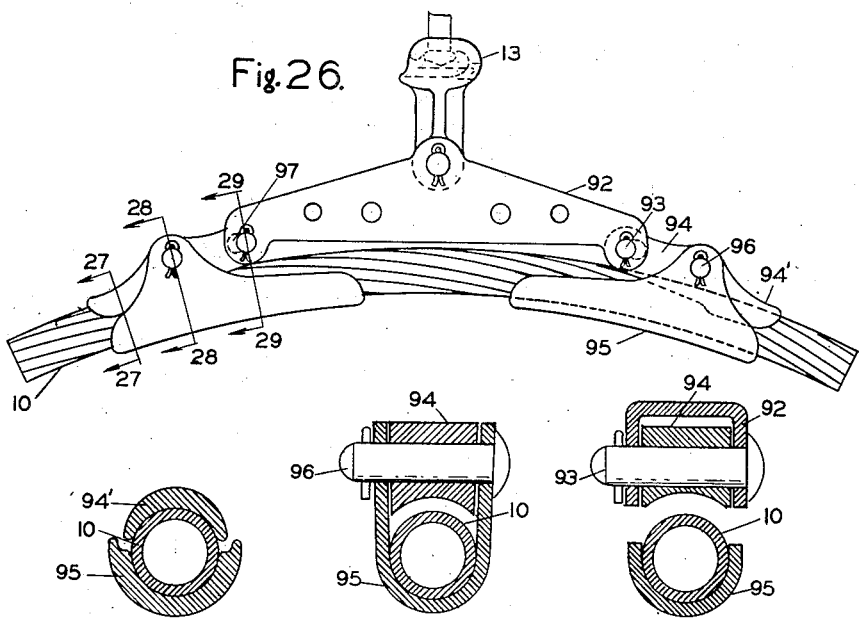
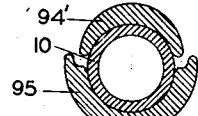
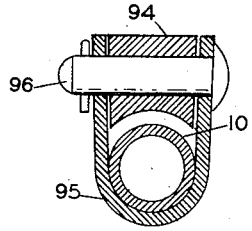
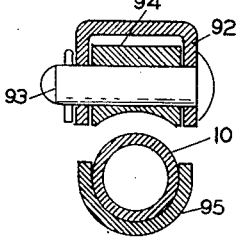
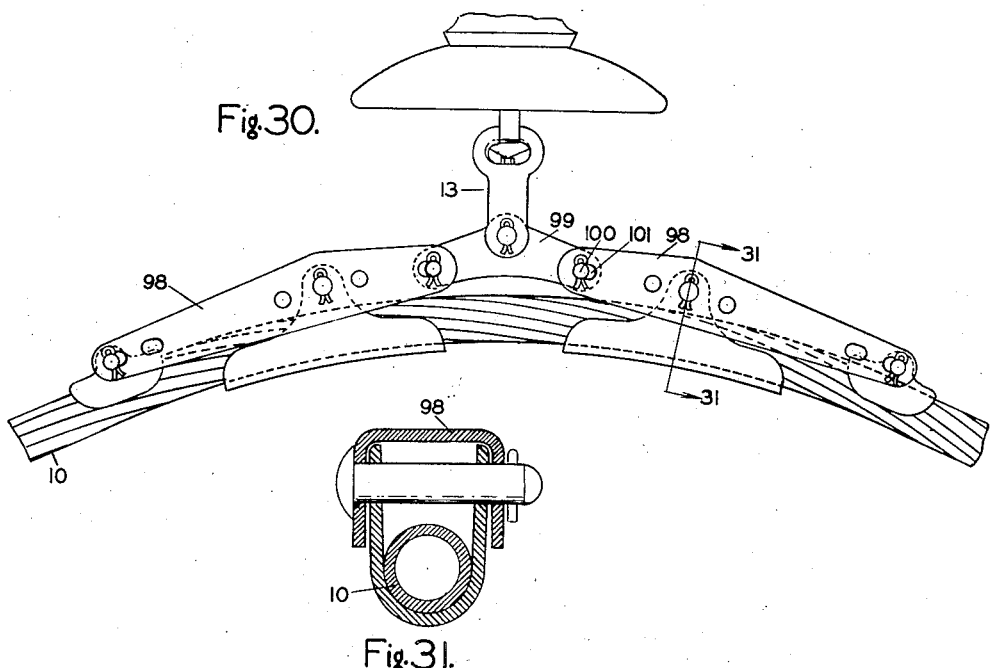
INVENTOR
Arthur O. Austin

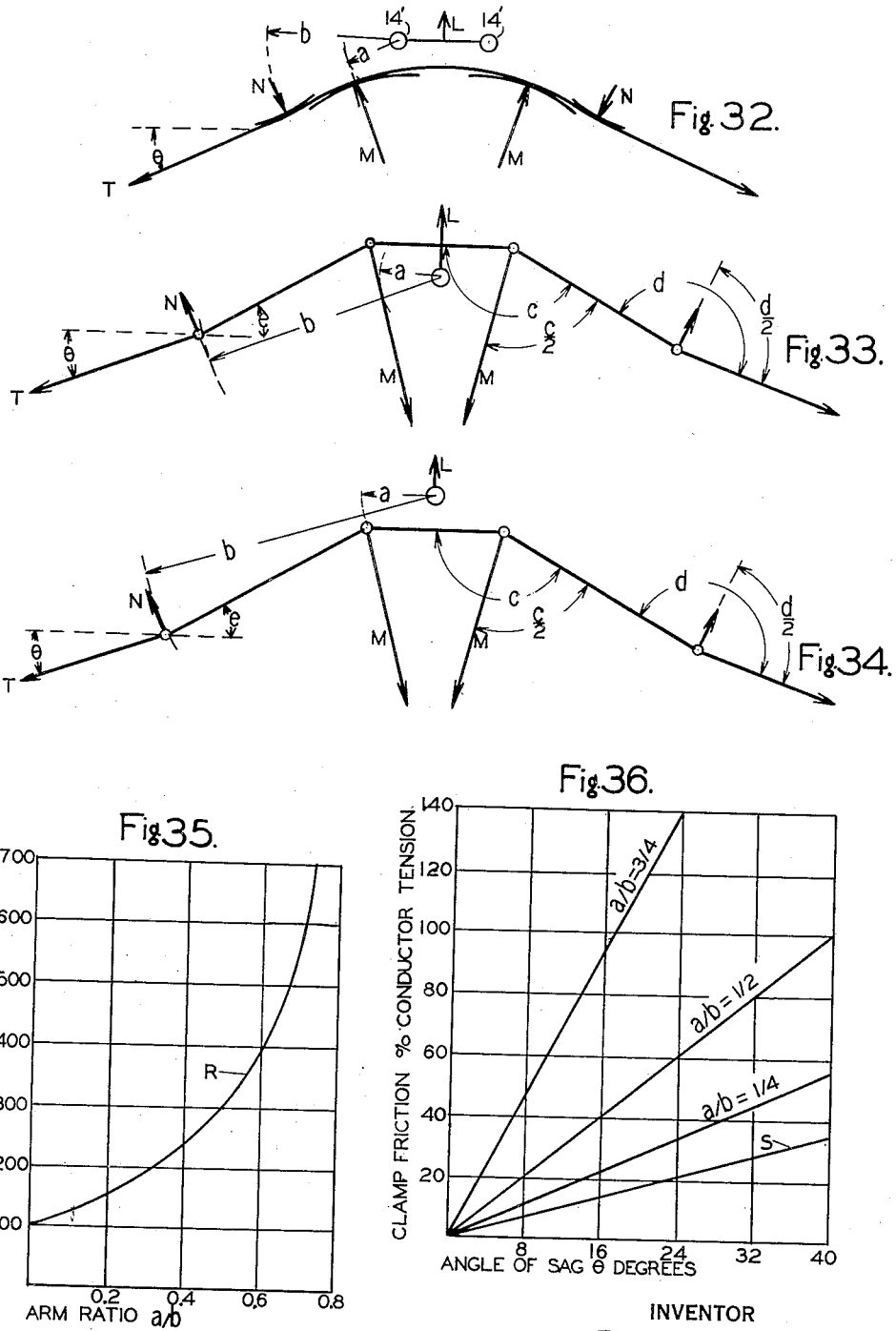

July 6, 1937.  A. O. AUSTIN  2,086,150
REACTION CLAMP FOR CONDUCTORS OR THE LIKE
Filed Nov. 29, 1933  6 Sheets-Sheet 6

$R = r + H$
$= (a \cotan x) + H$
ARC $= (2X/180)(\pi R)$ $R = r + S$
$= [(a \cotan x) - H] + (y \cosec x)$
ARC $= (2X/180)(\pi R)$ INVENTOR
Arthur O. Austin Patented July 6, 1937

2,086,150

UNITED STATES PATENT OFFICE 2,086,150

REACTION CLAMP FOR CONDUCTORS OR THE LIKE

Arthur O. Austin, near Barberton, Ohio

Application November 29, 1933, Serial No. 700,270

12 Claims. (Cl. 248—63)

This invention relates to clamps for holding the conductors of electrical transmission lines or other cables and more particularly conductors which require a large radius of curvature at the point of support or which are likely to be damaged by vibration or power arcs.

One object of the invention is to provide a clamp which will automatically permit a wide range in the angle of sag.

A further object is to provide a construction which will permit travelling waves or oscillations with a minimum amount of displacement at the clamp.

A further object is to provide means whereby the grip of the clamp is controlled by tension and direction of the conductor.

A further object is to control the pressure between clamp seats and conductor.

A further object is to provide a construction which permits of the absorption of the energy of vibration.

A further object is to provide a clamp which reduces the bending or flexure of the members composing the conductor due to vibration or change in angle of sag.

A further object is to provide a construction which will shield the conductor from power arcs.

A further object is to provide a construction which will permit high operating voltages without corona discharge.

A further object is to provide a construction which may be used to reduce or control the grip of the conductor and relieve the insulators and supporting structure in case of a broken conductor.

A further object is to provide a clamp which will be simple to manufacture and install and which will reduce the tendency of the conductor to be damaged by chafing or fatigue due to vibrations or oscillations, or change in the angle of sag.

Other objects and advantages will appear from the following description.

The invention is exemplified in a combination and arrangement of parts shown in the accompanying drawings and described in the following specification, and it is more particularly pointed out in the appended claims.

In the drawings:

Fig. 1 is an elevation of one form of the clamp.

Fig. 2 is an enlarged section on line 2—2 of Fig. 1.

Fig. 3 is an enlarged section on line 3—3 of Fig. 1.

Fig. 4 is an elevation showing another modification of the clamp.

Fig. 5 is an enlarged section on line 5—5 of Fig. 4.

Fig. 6 is an enlarged section on line 6—6 of Fig. 4.

Fig. 7 is an enlarged section on line 7—7 of Fig. 4.

Fig. 8 is an elevation of another modification of the clamp.

Fig. 9 is an enlarged section on line 9—9 of Fig. 8.

Fig. 10 is an enlarged section on line 10—10 of Fig. 8.

Fig. 11 is an elevation of another modification of the clamp.

Fig. 12 is a plan of the clamp shown in Fig. 11.

Fig. 13 is an enlarged section on line 13—13 of Fig. 11.

Fig. 14 is an enlarged section on line 14—14 of Figs. 11 and 12.

Fig. 15 is another modification of the clamp.

Fig. 16 is an enlarged section on line 16—16 of Figure 15.

Fig. 17 is an elevation of another modification of the clamp.

Fig. 18 is an enlarged section on line 18—18 of Fig. 17.

Fig. 19 is an enlarged section on line 19—19 of Fig. 17.

Fig. 20 is an enlarged section on line 20—20 of Fig. 17.

Fig. 21 is a fragmentary elevation of a modified form of clamping member.

Fig. 22 is an elevation of another modification of the clamp.

Fig. 23 is an enlarged section on line 23—23 of Fig. 22.

Fig. 24 is an enlarged section on line 24—24 of Fig. 22.

Fig. 25 is an enlarged section on line 25—25 of Fig. 22.

Fig. 26 is another modification of the clamp.

Fig. 27 is an enlarged section on line 27—27 of Fig. 26.

Fig. 28 is an enlarged section on line 28—28 of Fig. 26.

Fig. 29 is an enlarged section on line 29—29 of Fig. 26.

Fig. 30 is an elevation of another modification of the clamp.

Fig. 31 is an enlarged section on line 31—31 of Fig. 30.

Fig. 32 is a diagram of conductor and clamp showing the general arrangement of forces between clamp members and conductor, the arms being mounted on a yoke.

Fig. 33 is a diagram showing the resultant forces between conductor and clamp, the arms having a common point of rotation below the center line of the conductor.

Fig. 34 is a diagram showing the resultant forces between conductor and clamp, the arms having a common point of rotation above the center line of the conductor.

Fig. 35 is a graph showing the effect of lever arm ratio upon clamp friction.

Fig. 36 is a graph showing the effect of sag angle upon clamp friction for several different arm ratios.

Fig. 39 is an enlarged section on line 39—39 of Fig. 38.

Fig. 40 is an enlarged section on line 40—40 of Fig. 38.

Figure 37:
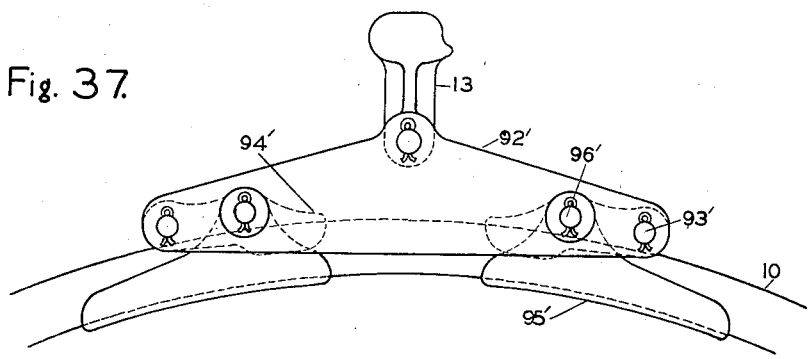
Fig. 37 is a side elevation of a clamp with the lever arms extending toward each other.
Figure 38:
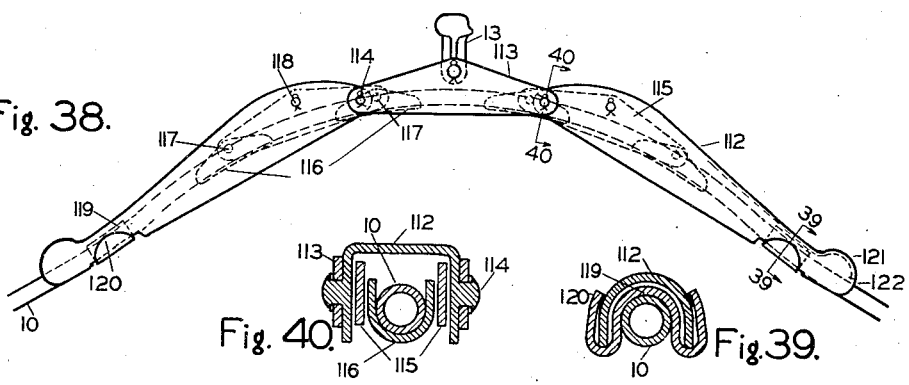
Fig. 38 is a side elevation of a clamp with articulated main seats.

In the electrical transmission of power there is a tendency toward the use of higher operating voltages in order to effect greater economy or reliability of operation. The limitations due to regulation or stability particularly where the transmission frequencies are high and the distances are long make it necessary to use high operating voltages in order to reduce the effect of reactance. As the voltage is increased the amount of current required for the transmission of a given amount of power is reduced, therefore it is frequently possible to use conductors of rather small cross section without incurring excessive resistance losses in the conductor. However, at the high operating voltages it is necessary that the conductor have a diameter sufficiently great that losses due to corona or brush discharge will be within economic limits.

In order to save the cost of material, conductors having hollow cores or lightened construction frequently are used. These conductors may be in the form of segmental tubes or have hollow strands or lightened cores constructed in various ways. Other types of conductors having large diameters may be composed of an outer conducting layer and a high strength core with or without a spacing layer between the two parts. High working tensions in the conductor cable reduce the sag and the number of supports required. The large diameter and high working tension tend to increase the danger of damage to the conductor due to vibrations or oscillations caused by wind upon the conductor or to working loads which may cause high stresses localized at the point of support.

The best combinations of diameter, cross section of material and working tensions for economical reasons may materially increase the danger of fatigue due to vibration or oscillation, or the flexing of the conductor at the point of support. The changes in the angle of sag or movement due to wind may cause a serious bending and fatigue of the material particularly where the diameter and elements of the conductor are large, or the material is such that the flexing or bending will cause fatigue and failure of the material.

As the diameter of the conductor is increased it is highly advisable that the radius of curvature at the suspension clamp be increased so that serious flexing or bending will not take place and lower the effective ultimate strength of the conductor or shorten its economic life. It is advisable that the radius of curvature should be sufficiently large so that any change in the effective radius of curvature due to vibration or change in the angle of sag will not cause overstressing and crystallization or fatigue in any part of the conductor.

It is possible to provide a large radius of curvature with the clamps ordinarily used having a curved seat of fixed radius by making the seat long enough even where the angle of sag is considerable. However, where a clamp of this kind is used any decrease in the angle of sag due to low temperature or other causes will raise the conductor from the seat of the clamp at the point of entry. Should vibration take place under this condition the conductor will beat against the clamp, which may cause serious damage to the conductor or clamp. If the conductor touches the side wall of the clamp the movement will cause wear which may damage both conductor and clamp. In conductors of the lighter construction particularly those of hollow construction, the conductor may flatten slightly which will cause it to bear upon the side walls of the clamp even though clearance may have been provided for the normal cross section of conductor.

While the friction may tend to dampen out oscillations, the wear and damage to the conductor and clamp is likely to be serious. It is therefore advisable that the relation between the conductor and clamp seat be maintained so that there will be no serious movement between them due to vibration or temperature changes which will cause wear and damage to the conductor.

While contact between conductor and clamp seat may be maintained by providing a clamping member at the outer end of the clamp seat, where this is done any reduction or change in the angle of sag during construction or operation will tend to cause the conductor to bend at the point of entrance.

Heavy loading of the conductor or pressure and friction between the strands may cause a reduction in diameter so that the grip of clamping bolts may be reduced or entirely released. This will permit vibration and pounding between the conductor and clamp. A heavy grip occasioned by clamping members at the point of entry may cause a deformation and weakening of the component parts of the conductor. The use of a grip member at the point of entry of the conductor to the clamp seat is therefore open to serious objections.

Conductors having hollow cores, light cross section or those having a soft outer layer are easily damaged by clamping too tightly. As the conductor tends to decrease in diameter with an increase in tension it is necessary to provide a high gripping pressure where bolts are used in order that there will be no looseness between the conductor and seat due to tension in the conductor which will permit damage due to vibration. It is difficult to provide sufficient resiliency in the grip members to insure tightness over the range of working conditions and it is frequently very difficult to prevent U bolts or J bolts from loosening due to vibration. Where the bolts loosen due to vibration or the corrosion of lock washers or bearing parts, the looseness may readily cause damage after a period of time.

For the above reasons it is highly advisable that a clamp construction be provided which will permit of a long radius of curvature so that the conductor or component parts will not be seriously bent or flexed under operating conditions. It is highly advisable that a definite means be provided which will prevent any looseness between conductor and bearing surfaces of the clamp. While it is advisable to limit the stress upon the conductor or to grade the pressure between conductor and clamp, this becomes more difficult as the grip or pressure is reduced, as looseness and damage due to pounding or vibration tends to increase with a light grip in the types of suspension clamp construction heretofore used.

My invention removes or reduces the objections common to clamps of the single or multiple seat type now generally used. These advantages will be particularly evident by consideration of the several figures.

In the form of clamp shown in Figs. 1, 2 and 3 the conductor 10 is supported by seat pieces 11 which in turn are supported by arms 12. The arms 12 are inverted channel shaped members the side walls of which project beyond the top wall at the adjacent ends of the arms and form ears 12′ which are pivotally attached to downwardly extending spaced legs of a socket adapter 13 which transfers the load to the suspension insulator and supporting structure. The arms 12 are U shaped members in cross section hinged by means of the bolts 14 which are used to attach the arms to the socket adapter 13. The bolts 14 allow the arms 12 to move freely in a vertical plane, the general arrangement being shown in Fig. 3.

Fig. 2 shows a section thru the main clamp seats. The clamp seat 11 rests in a groove formed by turning up the lower edge of the U shaped arm members 12. The clamp seats 11 may be moved toward the center of the clamp or away from the center so as to change the leverage and pressure between the conductor and seat. The position of the clamp seat with respect to the arm is maintained by a pin 15 or any other convenient means.

It is evident that tension in the conductor together with the angle with the horizontal or sag angle will produce a downward force or pressure upon the main seat members 11. Since these seat members are attached to the arms 12 they will tend to throw the outer ends of the arms 12 downward, rotating these arms about the pivot or fulcrum 14 attached to the adapter member 13. The downward movement or rotation of the arms will be arrested by contact between the top walls of the arms at their outer ends and the conductor. The reaction of the conductor on the outer ends of the arms will be sufficient to counteract the tendency of the arms to rotate due to the pressure produced by the bearing of the conductor upon the seat piece 11. The relative pressures between the conductor and the seat piece 11 and between the conductor and the outer ends of the clamp will be inversely proportional to the length of the respective lever arms or distance from the pin or fulcrum 14.

It is readily seen that the pressure upon the seat pieces 11 will depend upon the weight of the conductor and also upon the angle of sag or angle that the conductor makes with the horizontal and the tension in the conductor. The pressure also will depend upon well known reactions due to the relative distances from the fulcrum.

As the main seats 11 are moved outward from the center or fulcrum the torque tending to rotate the arms will be increased. This tendency to rotate will be arrested by the pressure between the conductor and the top walls or seats at the outer ends of the arms. Since the rotating torque is increased this can only be counteracted by an increased pressure between the conductor and the clamp at the outer end. It is therefore seen that as the seat piece 11 is moved outward, the pressure between the clamp and the conductor will be increased. The grip or clamp friction will depend upon the effective coefficient of friction and the pressure upon the conductor, this pressure being made up of both upward and downward components. If the main seats 11 are moved inwardly toward the fulcrum the torque tending to rotate the arms 12 will be reduced. The pressure between the conductor 10 at the point of entrance also will be reduced.

Since the grip depends upon the pressure and the coefficient of friction which will be relieved by a reduction in tension in the conductor, it is evident that the clamp may be so designed that a broken conductor will tend to relieve the grip and thereby protect the insulator and supporting structure.

The pressure between conductor and clamp depends upon the tension and sag angle together with the arm ratio for the clamp seats. This pressure may be controlled within wide limits and there will always be a positive pressure between conductor and clamp seats so that there will be no damage due to a vibrating conductor beating against a clamp. The construction may be very light and the point of contact with the conductor may be well out from the insulator support.

Reference to Fig. 1 and Fig. 3 shows that the position of the conductor is above the center line of the pin or fulcrum 14. As the arms move downwardly the location of the conductor will move in the same direction. As the arms move upwardly due to reduced sag the conductor also will move upwardly. As the sag is increased the conductor will move downwardly. It is therefore seen that the position of the conductor in the adapter 13 may be above or below the axis of the fulcrum 14. It is also seen that the conductor and clamp require but very little vertical space. This is of considerable benefit in increasing or conserving tower clearance, which is a very important item of cost in a transmission system.

The general reactions of the clamp just described are shown in Fig. 32, in which figure however the lever arms are pivoted on spaced pivot points 14′ on a supporting yoke instead of on a common axis. In Fig. 32 the arm "$a$" corresponds to the effective arm for the main seat pieces 11 and the arm "$b$" corresponds to the effective arm for the reaction seat at or near the outer end of the clamp. The sag angle or angle that the conductor makes with the horizontal is shown by $\theta$.

The effect of changing the arm ratio $a/b$, and increasing the clamp friction is shown in Fig. 35.

The effect of the sag angle in increasing the clamp friction for several different arm ratios is shown in Fig. 36. The friction in the seat of an ordinary clamp is shown by "S" in Fig. 36.

The construction permits of a long clamp member without serious inertia effects upon the conductor. The relatively light but definite pressure at the point of entry of the conductor is a distinct advantage. The long arm also tends to reduce the reaction between the conductor and seat at the outer end due to vibration. Since the main arm is free to rotate, any vibration or oscillation in the conductor can readily move the arm with seat pieces so that reflections and bending of the conductor will be materially reduced. The divided seat pieces 11 permit of a relatively longer radius of curvature for the conductor than that for a single seat piece.

With the construction shown a very smooth contour of the clamp may be provided as well as arc protection for the conductor without incurring losses or disturbance from corona discharge.

Fig. 4 shows a modification which is similar to Fig. 1 except that advantage is taken of the general construction in order to provide a frictional system for dampening out vibration. In Fig. 4 the arms 16 and 17 are similar to the arms 12 but are provided with extensions 18 and 19 respectively. These extensions preferably are integral parts of the arms 16 and 17, which may be made of pressed metal, forgings or castings. The outward end of the member 18 is provided with a friction or wearing shoe 20. The frictional shoe bears upon a member 21 attached to the arm 17. These members are readily replaceable so that they may be made of any suitable material. Projections 22 and 23 locate the friction member on the arm so it will not become displaced. Special attention is given to the design of the pieces so that they may be readily removed and replaced, even where the line is energized, by the use of suitable tools.

The bearing pressure and friction is increased by a spring 24 which bears upon the arm extension 18. The friction surfaces 20 and 21 may be dispensed with where ample material is provided in the clamp so that wear will not cause a serious weakening or where the danger of vibration is very small.

The pressure upon the frictional surfaces may be increased or reduced by adjusting the nut 25. A rib washer 26 is provided so that the nut cannot become loose. The main seat pieces 27 are supported by pins 28. A seat piece 29 extends thru the main seats 27, bridging the space between them and distributes the curvature in the conductor preventing sharp bends where the conductor leaves the seats of the clamp even though the seats have rather small longitudinal length. The location of this seat piece is shown in Fig. 6. The distributing seat member 29 may be made up of one or more members of any convenient form and may be used with practically any of the designs.

The arms 16 and 17 are provided at their outer ends with clamping means which increase the grip on the cable over that normally provided by the reaction between conductor and clamp. The stirrup 30 slips over the arm 16. A clamping piece 31 is forced against the conductor 10 by means of a screw 32 operating in a yoke member 33 which engages the stirrup 30. It is readily seen that a grip means of this kind may be added or removed from the clamp at any time to provide for a change in conditions.

The grip produced by the clamping member at the end of the arm supplements the grip due to the clamp reaction, therefore the loosening of this member would not necessarily cause destruction of the conductor. The member is so designed that should it become loose it will drop free of the clamp and conductor and not remain in position to hammer the conductor.

Fig. 8 shows a somewhat different modification in which a compound arm 34 is used in order to increase the clamp friction materially. The arm consists of a member 34 hinged at 35 to a seat member 36. The upward pressure on the member 34 due to the conductor reaction tends to throw the inner end of the member 34 downward. This bears upon the pins 37 which in turn press upon the grip members 38, thereby increasing the pressure between the main seat members 36 and the conductor. The friction is also further increased by the pressure between the seat 38 and the conductor. It is readily seen that this makes it possible to materially increase the pressure upon the conductor. The arms 34 may be placed either inside or outside of the U shaped seat pieces 36.

As shown in Fig. 9 the arm 34 bears against the pin 37 which in turn bears upon the seat piece 38. Clearance space 39 is provided so that the seat piece may be forced against the conductor 10. The supplementary spring piece 40 is shown for extending the seat and increasing the effective radius of curvature. It is evident that this member may be placed inside the main seat pieces or be used as a supplementary extension. These pieces are threaded thru an eye 41 formed in the regular seat piece.

As shown in Fig. 10 the main parts of the clamp are readily made from pressed metal parts, and therefore can be very light. By placing the fulcrum or hinge point 42 sufficiently low the tendency for the conductor to slide in the main clamp seats with the change in sag angle will be negligible. This avoids any tendency of chafing due to slipping of the conductor in the clamp seat, due to change in sag angle from vibration or tension in the conductor.

In the modification shown in Figs. 11, 12, 13, and 14 the clamp produces a horizontal bend in the conductor as it passes thru the clamp to insure a good contact between conductor and clamp seats and also to provide a pressure for the vibration dampener system. The arm 43 is provided with a main seat 44 open at its top and a downwardly opening seat 45 at the end of the arm. The arm 43 has an extension 43' which is equipped with a friction pad 46. The arm 47 is similar to 43 except that its extension 47' is carried by a bushing 47'' which passes thru a hole in the arm 43.

The socket adapter 51 is placed approximately in line with the portions of the conductor as they enter the clamp. This prevents tipping of the clamp or rotation about a horizontal axis. In general slight deflection only of the cable is necessary to produce the necessary dampening friction. However, if it is desired to change the deflection and frictional forces the arms 43' and 47' may be bent inwardly or the thickness of the friction pads 46 increased. This will increase the deflection and pressure. The pressure and friction losses may be reduced using thinner friction pads 46 or bending the arms 43' and 47' outwardly.

The general arrangement of the parts and the method of producing pressure for dampening vibration and for increasing grip in the clamps is shown more clearly in the plan shown in Figure 12. The tension in the conductor tends to straighten out the conductor as it passes thru the clamp. This tends to make the main arms with the friction members rotate so that the friction member attached to one arm tends to bear against the complementary arm on the opposite side of the fulcrum or axis. It is readily seen that the pressure may be changed materially by changing the horizontal offset in the conductor. The arms 43 and 47 are prevented from moving longitudinally by the pin 48—the arrangement being shown more clearly in Fig. 14. The pin works in slots in projections from the main arms 43 and 47. This prevents the rotation of the seat pieces about a horizontal axis. These slots allow a horizontal rotation of the arms with respect to each other about the bearing on pin 48. It is evident that a horizontal rotation will be arrested by the pressure between the arms 43' and 47' upon the main clamp arms. Any change in the angle of sag due to vibrations or oscillations will cause the arms 43' and 47' to move with respect to the main bodies. This will cause the friction losses between the friction members 46 and the main clamp body or arms. In order to provide a wide working range for sag angle or rotation about the fulcrum, the clamp body is provided with projections 50 so that the friction pads 46 will have a bearing surface thru the working range. The friction pad 46 is used to control the coefficient of friction and may be readily replaced should excessive wear take place. The main body of the clamp may be provided with a wearing shoe as previously described or the surface made sufficiently thick so that wear will be provided for.

The socket adapter 51 is part of a rigid member or arm to which the pins 48 and 49 are attached. The arm 52 passes underneath the clamp seats and conductor and provides an open seat so that the conductor may be dropped into place. This arrangement permits the assembly of the clamp before placing the conductor in position. However, it is evident that the socket adapter may be provided with an inverted U similar to that shown in Figure 10 to which the pins 48 and 49 may be attached. However, this will complicate the assembly in attaching to the conductor.

Fig. 15 shows another modification of the clamp in which the arm ratio may be readily changed in order that the grip or friction may be controlled. Where the clamp friction or grip can be controlled strong towers may be used occasionally with lighter intermediate towers. By increasing the clamp grip or friction at the strong towers any tendency for a successive tower failure or cascade will be arrested by the strong towers. This will permit the use of light and less expensive towers for the intermediate structures particularly where the grip or stress placed upon these intermediate towers is limited by the grip in the clamp. Increasing the arm ratio will make it possible to increase the grip very materially. In addition clamping means may be provided for the main clamp seats.

Such an arrangement is shown in Fig. 15. The main arms are made of two parts 53 and 54. The arrangement of the parts is shown more clearly in Fig. 16. The member 53 is a U shaped member with an upturned edge 55 which provides a seat for the U shaped member 54. In order to change the arm ratio the pin 56 may be removed and the seat member 57 shifted to a new location and the pin inserted in another hole. The arm ratio also may be changed by sliding the arm 54 in or out with respect to the complementary member 53, the pin 56 when reinserted maintaining the relation between the two members. The clamp or seat piece 57 is carried by the pin 56. This clamp may be made in any desired form and is shown provided with clamping screws or bolts 58 which are used to increase the friction.

Seat pieces 59 working in straps 60 attached to pins 61 provide seats at the outer ends of the clamp. This arrangement permits of longitudinal movement of the conductor with respect to the clamp arm without slippage between the conductor and cooperating clamp member. The arms 53 are attached to yoke 62 by means of links 63. The yoke in turn is attached to the insulator or support by a link or adapter 64.

The links 63 permit of longitudinal movement of the main clamp seats or arms to provide for changes in sag angle without the conductor slipping in the clamp seats or producing a serious bend.

In Fig. 17 a single main seat piece 65 is used in place of multiple seat pieces. The seat piece 65 is supported from two arms 66 by links 67. The arms 66 are inverted U shape in cross section. The attachment of the links is more clearly shown in Fig. 20. It is evident that the links 67 permit of a free rotation of the arms 66 about the fulcrum 68. The links 67 bear upon the arm pieces 66, tending to force the outer ends downward. This is resisted by the reaction between the conductor and clamp seats 69, the principle being the same as that in the forms of clamps previously described. With this arrangement there may be some longitudinal movement between the conductor and the outer ends of the clamp. This might cause destruction of the conductor and clamp. To prevent damage a seat piece 69 is provided which is free to move in the general direction of the arm or axis of the conductor as shown more clearly in Fig. 19.

The pin 70 projects thru an elongated hole in the arm 66 which permits the necessary movement. A head is provided for this pin so that the seat piece 69 will not become disengaged before or during assembly. Friction plates 71 are placed between the seat piece 69 and the arm 66. These pieces control the friction and remove wear from the main clamp members. It is evident that any longitudinal movement due to a change in the angle taken by the arm will cause dissipation of energy due to friction losses. This will tend to dampen out vibrations. The relative movement may be materially increased by raising the point of rotation 68 well above the axis of the conductor.

A modified form of seat which may be used in place of the seat 69 which provides for longitudinal movement and dampening at the point of entry of the conductor to the clamp is shown in Fig. 21. The seat piece 69' is carried by a pin 70' operating in elongated holes in the side walls of the arm 66. The pin 70' is supported by links which permit longitudinal movement of the seat 69' with respect to the arm 66 so that the conductor will not slip over the seat piece 69'. The longitudinal movement of the seat 69' causes movement of a spring member 71' attached to the seat. The member 71' moves in an arc about the center of rotation of the supporting links. It is evident that the longitudinal movement of the member 71' relative to the arm 66, on which it bears, is greater than that between the conductor and arm 66. This increase in the movement of the friction dampening members is very beneficial as the forces and wear between parts may be decreased and the dissipation of energy for slight vibration materially increased. The dampening member 71' is shown as a spring which is readily slipped into place, being held by a pin. The friction member 71' is not concealed and hence more readily inspected for wear than the friction members 71.

In the modification shown in Fig. 22 the arms 72 rotate about a pin 73. The main seat pieces 74 are attached to the arms by links 75, and pins 76. The arrangement is more clearly shown in Fig. 24. The link 75 is provided with tongues 77 which are pressed inward so that the clamp seats 74 cannot become disengaged from the link or stirrup 75 which permits rocking or longitudinal movement. Spaced holes may be provided in the arm 72 for the pin 76 so that the arm ratio and clamp friction may be adjusted by shifting the pins 76 and seat pieces 74. Longitudinal movement at the end of the clamp is provided for by a seat piece 78 which is free to move with respect to the arm 72, the arrangement of parts being more clearly shown in Fig. 23. The seat piece 78 bears upon a pin 79 which in turn bears upon the under surface of the arm 72. The pin 79 moves in a slot 80 in the arm. The seat piece 78 is provided with a rib 81 which prevents it from becoming disengaged from the arm before or during assembly. The arrangement in Fig. 22 permits of a material rotation of the arms 72 about the fulcrum 73 without producing slipping between the conductor and clamp members.

Since clamps of this construction would produce little friction due to movement and consequently small tendency to dampen out vibrations or oscillations, it may be necessary to provide dampeners. One form of such a dampener is shown attached to one of the arms in Fig. 22. The construction of this dampener is more clearly shown in Fig. 25. The dampener case 82 is provided with a cover 83 and is attached to the clamp arm by a spring member 84, which is attached to trunnions or pins 85. The dampener case encloses a piston 86. This piston has appreciable mass and therefore tends to remain stationary as the case is moved up and down rapidly due to vibration. The case preferably is filled with oil, glycerine or some fluid which will tend to resist the movement of the plunger 86 and dissipate energy as it flows past or thru the plunger.

In order to reduce wear the plunger is so designed that it will tend to rise or float so that there will be little or no contact and wear between metal parts. To accomplish this valves 87 and 88 are provided. These valves permit of a free downward flow of the fluid thru ports but resist an upward flow. This tends to support the piston 86 until sufficient flow takes place thru openings or around the outside of the piston. By making this piston conical and the inside surface of the case to correspond, it is evident that freer passage will be provided for the fluid as the piston rises. With this arrangement it is seen that the piston will tend to float free of either end. Springs 89 and 90 are provided so as to prevent damage during installation or for occasional severe movements in the arm which might cause a battering between the piston and case.

Two arrangements of valves are shown—an ordinary common plate or feather valve construction being shown in 87, and a sleeve valve 88 worked by inertia. It is evident that the axis of the piston should be normal to the movement of the arm. For this reason there may be a tendency for the piston to rub on the side of the case. This may be prevented by providing longitudinal grooves and a larger space 91 between the case and piston on the low side. This will provide a more effective pressure on this side and tend to force the piston in the opposite direction. This space preferably is provided in the proper side of the case so that the piston may be conical and free to rotate. This space generally would be rotated 90° from that shown in Fig. 25.

In the form of the invention shown in Fig. 26 the yoke 92 is provided with pins 93 to which arms 94 are attached. The arms 94 are attached to seat pieces 95 by means of pins 96. The arm 94 bears on the conductor at its outer end 94'. The seat piece 95 extends inwardly well past the pin 93. It is evident that if the arm 94 and the seat piece 95 were integral the bearing between the conductor and seat piece 95 would be the same as if the seat piece 95 were attached to the pin 93 by ears fixed to the seat piece. Therefore the position of the seat piece 95 would be the same as if it were supported by the pin 93, the arm 94 although hinged at 96 is held against rotation with respect to the seat piece 95 by contact with the cable. Any downward pressure produced by the cable upon the seat piece 95 will tend to cause the pin 96 to rotate about the pin 93. This will tend to force the outer end 94' downward against the conductor. Rotation of the seat piece 95 about 96 will be resisted by the force on the inner end so that the pressure between the conductor and the seat piece 95 and the seat piece 94 will depend upon the effective lever arms and the tension and sag angle of the conductor.

Provision for longitudinal movement without slipping of the conductor is provided with slots 97 or by attaching arms to the yoke by means of links as shown in Fig. 15. It is evident that the clamp seats may be reversed in direction, the gripping portion instead of being placed outwardly being placed adjacent to each other as shown in Fig. 37. It is also evident that these may be placed in the same general direction or if desired a single member only need be used. This will permit of a greater grip in one direction than in the other in case of a broken conductor if so desired. It is also evident that a single seat piece with two clamping arms may be used if desired, the clamping arms being attached by separate pins to a yoke member or to a common pin.

Fig. 30 shows a modified form of reaction type of clamp in which the pins for attaching the seat pieces are placed at one side of the conductor. This permits of one of the most inexpensive and simplest types of construction. The arms 98 are attached to the yoke 99 by pins 100. Slots 101 are provided in the arms so as to permit change in the sag angle without slipping or bending of the conductor. Slots and holes are provided in the arms 98 so that the arm ratio may be changed. This type of construction permits of a large part of the clamp being made up of light pressed metal parts in order to provide light weight and low cost. An arrangement of the parts is shown in Fig. 31.

The clamps are particularly applicable to hollow or light conductors which may be made up of segments, tubular members or members made up in various shapes. The clamps are also adaptable to other types of conductors in which favorable conditions are desired in order that high working tensions may be used and improved conditions for vibration provided. Aluminum conductors having steel cores or conductors having high strength cores and lower strength outer layers which are likely to be damaged by bending or friction are readily supported by clamps of the type shown.

Fig. 32 is a diagram showing the general relations of pressure between the clamp members and conductor.

The general principles are the same whether or not the arms are attached to a common point of rotation or to two spaced points on a yoke as in Fig. 32. In Fig. 32 the tension "T" in the conductor acting thru the sag angle produces a total downward pull upon the clamp system which must be resisted by a counter force "L". In Fig. 32 the force exerted by the main seats upon the conductor is shown in magnitude and direction by "M" and that of the reaction clamps at the outer ends of the arm by "N". The effective arm lengths tending to cause rotation of the arms are shown by "$a$" and "$b$".

It is understood that in the diagrams the forces are the same on either side of the center line. In the case of an unbalanced force the tension in the conductor will be different on the two sides. However, reference to Figs. 35 and 36 will show that the clamps may be designed for a very large unbalanced force or so as to limit the grip and the amount of the unbalanced force.

The analysis of the resultant forces is more clearly shown in Fig. 33 where the main resultants of the force exerted upon the clamp by the conductor and insulator or support only are shown. The angle "$c$" plus angle "$e$" equals 180°, or $$c + \{180 - (d - \theta)\} = 180$$

all quantities being expressed in degrees.

Also, $\quad d - \theta = c$, or $d = c + \theta$

Since the arms of the clamp will rotate until the forces are balanced, the resultant "M" acting on the main seat thru the arm "$a$" will be balanced by the force "N" acting upon the reaction seat thru the arm "$b$". The resultants "M" and "N" will bisect the angles "$c$" and "$d$" respectively, therefore $$M \times a = N \times b$$

However, assuming that the tension in the conductor is the same at all points the resultant forces "M" and "N" will depend upon the angle "$c$" and "$d$", or $$M = 2 \times T \cos(c/2)$$

and $$N = 2T \cos(d/2.)$$

The torques produced by "M" and "N" must be equal and opposite, or changing the arm ratio. Referring to Fig. 35 "R" shows the increase in grip or clamp friction due to a change in the arm ratio as compared to the grip produced by a conductor resting in a single seat without clamping members.

Fig. 36 shows the effect of the sag angle upon clamp friction for several different arm ratios and "S" for a single seat clamp. It is readily seen that the invention makes it possible to construct a clamp which will have long arms and provide a large radius of curvature for the conductor without producing excessive bending moments as would be the case where clamps of the ordinary type are used.

The automatic adjustment of the clamp for changes in sag angle is of very great benefit as it is not necessary to change the grip members.

The construction also permits of gripping the conductor due to reactions set up by tension in same.

The construction also permits of a vertical movement in the conductor, reducing reflections.

The invention also adapts itself readily to clamp members which will provide arc protection and dampener schemes which will absorb or limit the amplitude of vibration.

The point of rotation may be placed at any desired point above or below the conductor, making it possible to select a position which will cause a negligible longitudinal movement between the conductor and the clamp members or arms for a considerable change in angle of sag.

The construction permits of manufacture at relatively low cost for clamps of large size and of such contour that corona or brush discharges will be avoided.

The arrangement is such that a broken conductor will not produce serious bending moments upon the clamp and the multiple seats reduce the radius of bend in case of a broken conductor.

Ready means are provided for controlling the grip so that strong and light towers may be used to greatest advantage.

Fig. 37 is similar to Fig. 26 with the exception that the conductor seats have been turned around with respect to the yoke. This reduces the length of conductor between grip points so that any tendency of the conductor to buckle or bend due to a change in the sag angle would be reduced materially owing to the short section of conductor between the clamp pieces. It is evident that the two main body pieces can be combined. Howmove inward the chord for the arc formed by the conductor will be decreased. However, if the radius for a given chord is decreased sufficiently the same length of arc will be required for the reduced length of chord. By selecting the proper distance "Y" and the proper height of the hinge point 114 with respect to the seat pieces in the arms 112 a relation may be obtained so that the arms may swing thru a very appreciable angle without any tendency on the part of the conductor to slide in the seat pieces.

Figure 41:
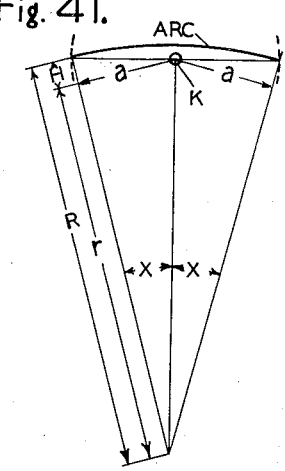
Figs. 41 and 42 are diagrammatic views illustrating the action of the invention.
Figure 42:
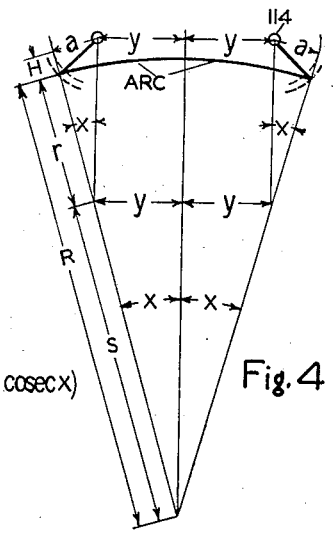

With the lever type of clamp it is possible to move the hinge points for the arms either up or down with respect to the location of the conductor. This is a material advantage as will be seen by a consideration of Fig. 41. In Fig. 41 the arm swings about a hinge point "K". "a" is the distance to the main seat or resultant "M" of Figs. 33 and 34. "H" is the distance between the tangent to the center line of the conductor and intersection with "M" and "a", which is normal to the resultant "M". This permits the determination of the radius of curvature for the conductor and the length of an arc of uniform radius for different values of the angle "X". The radius of curvature $$R = H + r = H + a \cot X$$

length of arc between the two main seats can be readily determined once "R" is known. The length of arc between the two main resultants "M" equals $$(2X/360) \times 2\pi R = (X/90)\pi R$$

Since the angle "X" will vary with the angle of sag all that is necessary to determine the proper value for "H" for a given value of "a" is to substitute different values of "H" for the working range of the angle "X", and determine the length of arc. The length of arc should be approximately constant thru the working range of $\theta$ in order to avoid slipping. This simplifies the construction of the clamp, reducing the number of parts and eliminates the necessity of links or slots.

Where the working range of sag angles is small "H" usually will be less than 10% of "a". For larger sag angles this value will increase radius which tends to reduce corona or brush discharges. The outer ends of the clamp are equipped with large rounded terminal portions 121. By providing these with a slot or opening 122 the sides may pass down over the conductor and produce screening without coming in contact with the conductor.

The yokes 115 permit the ready adjustment or equalizing of force upon seat pieces 116 on either side of the yokes. The two seat pieces and a yoke act similar to a single main seat piece. However, the use of two seats in place of one makes it possible to utilize the contact surface of the seat pieces over a much wider range of curvature, and the conductor can be supported with minimum amount of bend over a much greater the angle of the arm angle "X", therefore it is possible to change the value of "H" as the ratio of the length of the arm "a" to the distance from the center line to the hinge point of the arm "Y" is decreased, the value of "H" must be decreased and becomes negative in the equation when placed above the line of tangency. By choosing the proper relations of yoke length, arm length and the value of "H" a wide variety of combinations may be made up in which there will be little or no tendency for the conductor to slip due to a change in the sag angle when a uniform radius of curvature is obtained. The uniform radius of curvature may be approximated very closely by providing sufficient support, by the seats, increasing the number of seats, or by using a supplementary support where curvature bearing will take place near the outer ends so that the conductor may be regarded as supported at a number of spaced points. The length of seat may be so taken that these points will supply a uniformly distributed support for the conductor as it passes thru the clamp.

As the sag angle increases the arms swing downward. The pins 118 with the yokes 115 and clamp seats 116 tend to move inward and downward. It is evident that the radius of curvature for the conductor also will be decreased, as the maximum radius which may be obtained for a uniform bend will be normal to the resulting force passing thru the pins 118. As the points the rigidity of the conductor will not provide the proper arc between bearing points or seats.

It is evident that as the radius of curvature increases there will be a tendency for the conductor to slip between seat pieces attached to the same yoke unless the clamp seats move so as to shorten the chord for the conductor between these two seats so as to conform to the changed radius of curvature. This is readily provided by raising the trunnions or point of pivoting of the seat pieces above the center line of the conductor. This distance is generally from four to six percent of the distance between the hinge points of the yoke. This method of changing the length of chord to compensate for the change in radius is shown in my copending application Serial No. 700,271, filed November 29, 1933, which has now become Patent No. 2,062,283, December 1, 1936.

I claim:

1. A support for a conductor comprising a pair of arms pivotally supported at their adjacent ends, a seat on each arm for supporting a conductor, said seats being spaced from the pivotally supported ends of said arms so that force exerted by said conductor upon said seats tends to swing said arms toward each other about said pivotal support, and a stop on each arm for engaging said conductor to limit the pivotal movement of said arm and to cooperate with said seat to grip said conductor.

2. A support for a conductor comprising a pair of arms pivotally mounted at adjacent ends thereof, each arm having a seat thereon spaced from its pivotal support for engaging a conductor, a stop on each arm for engaging said conductor at points spaced from said support beyond said seats to limit rotation of said arms under the force exerted on said seats by said conductor and to cooperate with said seats to grip said conductor, said stops being held in contact with said conductor for various angular positions thereof relative to said support, and frictional means for damping out movement of said arms about their pivotal support.

3. A conductor support comprising a carrier member, arms having spaced ears pivotally mounted on said carrier member and providing clearance for movement of a conductor vertically past the pivotal axis of said arms, a seat for a conductor carried by each of said arms at points spaced from the pivotal support therefor and stops carried by said arms for engaging said conductor to grip the conductor and to limit rotation of said arms about their pivotal support.

4. A support for a conductor comprising a pair of pivotally connected arms, each arm having an extension thereon, projecting past its pivotal support and having frictional engagement with the other arm to damp out relative pivotal movement of said arms, and means on said arms actuated by the force exerted thereon by said conductor for gripping said conductor.

5. A support for a conductor comprising an arm formed of pressed metal and having an inverted U shape in cross section, the edges of said metal being bent inwardly to form grooves, a seat supported in said grooves and adjustable longitudinally of said arm and means for holding said seat in its adjusted positions.

6. A support for a conductor comprising a gripping member pivotally mounted at one end thereof and engaging a conductor adjacent the opposite end thereof, said gripping member extending longitudinally of said conductor so that its ends are spaced apart in the direction of the length of said conductor and a seat member pivotally mounted on said gripping member at a point spaced longitudinally of said gripping member between the point of pivotal mounting of said gripping member and said point of engagement of said gripping member adjacent its end with said conductor, said seat member engaging the side of the said conductor opposite that engaged by said gripping member.

7. A conductor support comprising a pair of arms pivotally mounted at their adjacent ends, a seat member carried by each of said arms for supporting a conductor, a contact member carried by each arm and cooperating with the seat member thereon for limiting the rotation of the arm and for gripping the conductor, and means for frictionally engaging a friction surface fixed to one of said arms for damping vibrations in said conductor.

8. A support for a conductor comprising a pair of arms pivotally supported at their adjacent ends, a seat on each arm for supporting a conductor, said seats being spaced from the pivotally supported ends of said arms so that force exerted by said conductor upon said seats tends to swing said arms toward each other about said pivotal support, and a stop on each arm spaced longitudinally of said arm away from the pivotal support beyond said seat, for engaging said conductor to limit the pivotal movement of said arm and to cooperate with said seat to grip said conductor.

9. A conductor support comprising a lever arm, a fulcrum support for said lever arm, a seat for a conductor carried by said lever arm and spaced away from said fulcrum support so that pressure on said seat tends to rotate said lever arm about its fulcrum, a stop on said lever arm in position to engage said conductor at a point along said arm beyond said seat from said fulcrum and at the opposite side of said conductor from said seat, to limit the rotation of said lever arm about its fulcrum and to cooperate with said seat to grip said conductor.

10. A support for a conductor comprising a pair of lever arms pivotally supported at adjacent ends, a seat on each arm for supporting a conductor, said seats being spaced from the pivotally supported ends of the arms so that force exerted by said conductor upon said seats tends to swing said arms toward each other about their pivotal supports and a stop on each arm spaced from its pivotal support beyond the seat thereon for limiting the rotation of said arm about its pivotal support and for cooperating with said seat to grip said conductor, said stop being movable on said arm to provide for relative movement between said arm and conductor without slipping between said conductor and stop.

11. A support for a conductor comprising a pair of lever arms pivotally supported at adjacent ends, a seat on each arm for supporting a conductor, said seats being spaced from the pivotally supported ends of said arms so that force exerted on said seats by said conductor tends to rotate said arms about their pivotal supports, and a stop on each arm for engaging said conductor to limit the pivotal movement of said arm and to cooperate with said seat to grip the conductor said seat being movable on said arm to provide for relative movement between said arm and conductor without slipping between said conductor and seat.

12. A support for a conductor comprising a pair of arms, means for pivotally supporting said arms to swing about a common axis, said arms extending in opposite directions from said axis, the oppositely extending portions of said arms having means for supporting a conductor thereon, one of said arms having a projection thereon extending past said common axis, said projection having a frictional surface fixed thereto and engaging a frictional surface fixed to the other of said arms to damp out vibrations imparted to said arms by said conductor.

ARTHUR O. AUSTIN.